US 7,081,827 B2

(12) United States Patent
Addy

(10) Patent No.: US 7,081,827 B2
(45) Date of Patent: Jul. 25, 2006

(54) POWER OVER ETHERNET-PRIORITIZED ACTIVE SPLITTER

(75) Inventor: Kenneth L. Addy, Massapequa, NY (US)

(73) Assignee: Honeywell International, Inc., Morristown, NJ (US)

( * ) Notice: Subject to any disclaimer, the term of this patent is extended or adjusted under 35 U.S.C. 154(b) by 44 days.

(21) Appl. No.: 10/818,414

(22) Filed: Apr. 5, 2004

(65) Prior Publication Data

US 2005/0229016 A1    Oct. 13, 2005

(51) Int. Cl.
G08B 23/00 (2006.01)
(52) U.S. Cl. .................. 340/693.2; 340/506; 340/507; 340/509; 340/510; 340/693.1; 340/693.3; 340/693.4; 714/14; 307/38; 700/293
(58) Field of Classification Search ............. 340/693.2, 340/506, 507, 509, 510, 693.1, 693.3, 693.4; 714/14; 307/38, 66; 700/293; 713/300
See application file for complete search history.

(56) References Cited

U.S. PATENT DOCUMENTS

| 4,567,557 | A | * | 1/1986 | Burns ........................... 700/16 |
| 4,620,283 | A | * | 10/1986 | Butt et al. ................... 700/295 |
| 5,319,571 | A | * | 6/1994 | Langer et al. ............... 713/300 |
| 5,381,554 | A | * | 1/1995 | Langer et al. ................ 714/14 |
| 6,583,521 | B1 | * | 6/2003 | Lagod et al. ................. 307/70 |

OTHER PUBLICATIONS

PowerDsine web page Mar. 2004.
Powerover Ethernet Midspan web page Mar. 2004.
PowerDsine 6000 Power over Ethernet Family web page Mar. 2004.
PowerDsine Active Splitter web page Mar. 2004.

* cited by examiner

Primary Examiner—Daryl C Pope
(74) Attorney, Agent, or Firm—Scully, Scott, Murphy & Presser, P.C.

(57) ABSTRACT

A POE (power over Ethernet)-prioritized active splitter is disclosed for a prioritized network having different priorities such as a network security system that uses an intelligent POE power supply with a prioritized back-up response, allowing a lower cost UPS (uninterruptible power supply) system to be used, and also providing a longer back-up time period by the UPS system for more critical components of the security system. A simple embodiment operates with only two priority levels, a high priority level for more critical components of the, such as the cable modem, the system router, fire alarm devices, local warning devices and the alarm communicator, while less critical components are supplied with electrical power at the low priority level. In the event of a power outage or disconnection, the critical high priority components remain connected to the Ethernet network to be supplied with electrical power by the UPS system and also to communicate over the twisted wire pairs of the Ethernet network.

20 Claims, 1 Drawing Sheet

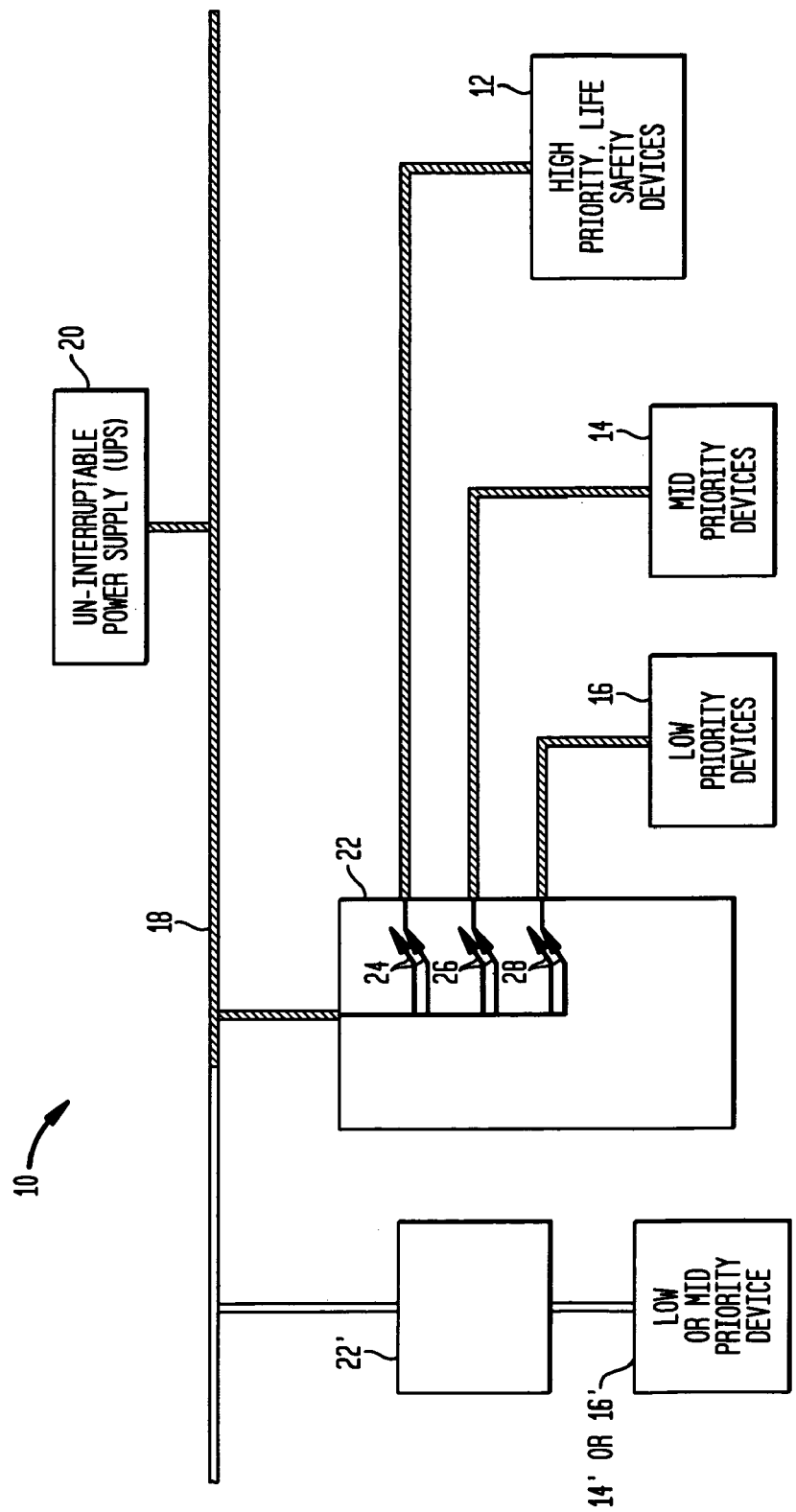

POWER OVER ETHERNET-PRIORITIZED ACTIVE SPLITTER

BACKGROUND OF THE INVENTION

1. Field of the Invention

The present invention relates generally to a POE (power over Ethernet)-prioritized active splitter, and more particularly pertains to a POE-prioritized active splitter that uses an intelligent POE power supply with a prioritized back-up response, allowing a lower cost UPS (uninterruptible power supply) system to be used, and also providing a longer back-up time period by the UPS system for critical components of a prioritized network having different priorities such as a security system or any prioritized network such as an internet or intranet based network, a monitoring system network, communication system network, etc.

2. Discussion of the Prior Art

A recently released standard, IEEE 802-3af for POE (power over Ethernet), addresses the technical field of development wherein electrical power/current is provided to networking hardware devices over Ethernet category 5 or higher data electrical wiring/cables. No additional AC or DC power line is needed to supply electrical power at the product or hardware locations, thereby minimizing the amount of required electrical wiring/cables and/or the problem and expense of installing additional power lines and outlets.

In a residential or commercial security system, the security system control panel is frequently connected to various security system peripheral hardware devices using structured wiring/cables. POE devices use category 5 or higher structured wiring/cables, which generally include several twisted wire pairs, for providing both data transmission to and electrical power for the security system peripheral hardware devices.

A conventional security control panel uses a proprietary bus and separate wiring/cables within a building to communicate with zone-expansion modules, RF (radio frequency) receivers, internet alarm reporting devices, IP (internet protocol-allows a camera to connect to and communicate directly over an Ethernet network) cameras, etc., wherein the separate wiring/cables carry the data communications traffic as well as provide source electrical power to the security system peripheral devices.

In most new residential construction and commercial buildings, the building is prewired with category 5 wiring/cables for business communications, or for a home network, typically connected through a router to a cable modem or ADSL (asymmetrical digital subscriber line) connection and then to an internetwork (the internet). While the use of the existing category 5 wiring/cables reduces the time and cost of wiring a security system, it has several associated disadvantages and problems:

Problem 1) Should the LAN (local area network) become disabled for any reason, then data messages between the various component devices of the security system may be interrupted and lost.

Problem 2) Should the local AC power supply become interrupted such as by a general power outage, then the security system component devices also lose power, and the security system becomes inoperative.

Problem 1) is typically addressed and mitigated by providing a second redundant communication system, such that if internet connectivity to a central security station is lost, or the LAN traffic is disrupted, then an independent trouble report message can be sent, perhaps by conventional POTS (plain old telephone service), or by using a long range RF network. This solution requires that the entire security system, including the back-up communication system, remains powered. This is really a poor solution since although a trouble report message may be sent, the security system still remains inoperative until the LAN becomes operative and functional again.

Problem 2) is typically addressed and mitigated by the use of various power supply back-up measures, for example by providing stand-by generators in the larger systems, or by providing a low cost battery powered UPS (uninterruptible power supply) system in residential systems. However the cost and size of UPS systems, and the required maintenance on these UPS systems has not resulted in widespread use of UPS systems of sufficient capacity, particularly in low cost residential systems.

SUMMARY OF THE INVENTION

The present invention provides a POE (power over Ethernet)-prioritized active splitter that uses an intelligent POE power supply with a prioritized back-up response, allowing a lower cost UPS (uninterruptible power supply) system to be used, and also providing a longer back-up time period by the UPS system for critical components of a prioritized network having different priorities such as a security system or any prioritized network such as an internet or intranet based network, a monitoring system network, communication system network, etc.

BRIEF DESCRIPTION OF THE DRAWINGS

The foregoing objects and advantages of the present invention for a POE-prioritized active splitter may be more readily understood by one skilled in the art with reference being had to the following detailed description of several embodiments thereof, taken in conjunction with the accompanying drawings in which:

FIG. 1 illustrates an exemplary embodiment of the present invention which sets up a POE power supply with different levels of priority for the different devices on a security system Ethernet network, high priority level life and safety concerned devices, mid priority level devices, and low priority level devices.

DETAILED DESCRIPTION OF THE INVENTION

The present invention provides a POE prioritized active splitter which solves the problems associated with the prior art by using an intelligent POE power supply with a prioritized back-up response, allowing a lower cost UPS system to be used, and also providing a longer back-up time period by the UPS system for critical components of a security system.

In an ideal world, the AC power supply to all network components of a security system would be backed-up by an uninterruptible power supply (UPS) or by battery power for a period of several hours to cover emergency power outages. This may be possible in large commercial environments, but is generally not feasible in residential or small commercial environments. In these smaller residential or commercial installations, when power fails, the UPS system (if present) provides only a brief back-up time period until the UPS system also fails. Failure of the UPS system results in a failure of the computer controlling the security system network, and the security system network routers and switches, and in this specific case, all security devices powered by POE, clearly a catastrophic situation for a life-safety security system.

PowerDsine corporation provides commercial products, such as the 6000 active-splitter series, that allow a UPS system to supply power to system components powered using POE. However, these devices do not discriminate between the networked devices that are being powered. Consequently, all devices on the network remain powered for as long a period of time as the UPS system can support the network devices.

The present invention improves current in-line POE active-splitter devices by setting up the POE power supply with different levels of priority for the devices on the network. For example, a simple embodiment of the present invention might operate with only two priority levels, a high priority level and a low priority level. In an exemplary embodiment in a residential security system, the more critical components of the security system network, such as the cable modem, the system router, fire alarm devices, local warning devices and the alarm communicator are supplied with electrical power at the high priority level, while less critical components are supplied with electrical power at the low priority level. In the event of a power outage or disconnection, the critical high priority components remain connected to the Ethernet network to be supplied with electrical power over the Ethernet network from the UPS system, and also to communicate over the Ethernet network. In more comprehensive embodiments, some of the more critical components might also be disconnected from electrical power supplied by the UPS system after a period of time, and if the system router is disconnected, the remaining connected components can still communicate over the twisted wire pairs of the Ethernet network, although not with an Ethernet reliant communication protocol, for example with a simple peer to peer communication protocol. As an example, the IP cameras might not be able to use the Ethernet to transmit video frames, but could use a peer to peer communication protocol to transmit a trouble message that a trouble condition exists on the Ethernet concerning the transmission of video frames.

A more comprehensive embodiment of the present invention might operate with more than two priority levels, for example a high priority level, a mid priority level, and a low priority level. In an exemplary embodiment in a residential security system, the most critical components of the security system network, such as the cable modem, the system router, fire alarm devices, local warning devices and the alarm communicator are supplied with electrical power at the high priority level, while lesser critical components such as intrusion detection devices are supplied with electrical power at the mid priority level, and the least critical components such as HVAC (heating, ventilation, air conditioning) and home comfort devices are supplied with electrical power at the low priority level.

As a further example, in the event of a power outage or disconnection, the low priority devices are disconnected from the UPS system over the Ethernet and are also disconnected from data communications over the Ethernet. In the event the power outage or disconnection lasts for some given duration of time (e.g. 2 hours), the mid priority devices are also disconnected from the UPS system over the Ethernet and disconnected from data communications over the Ethernet. The critical high priority components remain connected to the Ethernet network to be supplied with electrical power over the Ethernet network from the UPS system and also to communicate over the twisted wire pairs of the Ethernet network, although not necessarily with an Ethernet reliant communication protocol, for example with a simple peer to peer communication protocol. As a further example, the high priority devices might include components of the fire alarm system, and the mid priority devices might include other security components of the security system such as intrusion detectors Thus in the case of a power outage or failure, the more critical components of the home security system network are supplied with electrical powered for the longest period of time, and secondary and lower priority devices are electronically switched out of the system network to reduce the power load on the UPS power supply.

A second aspect of the present invention deals with the situation where the LAN itself becomes inoperative for some reason. In this situation, the prioritized active splitter disconnects all lower priority devices from the security system network. If the LAN is not totally inoperative and the system router is disconnected, the connected high priority devices can still use the physical cable of the network to communicate messages with a fall-back, simple communication protocol, such as a peer to peer protocol, that is not reliant upon Ethernet. Thus a fire alarm system, which is normally reliant on Ethernet and an internet connection to detect and report a fire alarm condition, would fall back to an alternative messaging protocol using the physical category 5 wiring/cable of the network to transport alarm signals from sensor devices to a central station via a back-up, non-internet communication system.

FIG. 1 illustrates an exemplary embodiment of the present invention which sets up the POE power supply with different levels of priority for the devices on a security system 10 Ethernet network, high priority level life and safety concerned devices 12, mid priority level devices 14, and low priority level devices 16. In the exemplary embodiment in a security system, the most critical components/devices 12 of the security system, such as the cable modem, the system router, fire alarm devices, local warning devices and the alarm communicator are supplied with electrical power at the high priority level, while lesser critical components/devices 14 such as intrusion detection devices are supplied with electrical power at the mid priority level, and the least critical components/devices 16 such as HVAC (heating, ventilation, air conditioning) and home comfort devices are supplied with electrical power at the low priority level.

FIG. 1 illustrates the security system having a network of security system devices connected over an Ethernet network line 18 which actually includes several twisted wire pairs, with some twisted wire pairs carrying electrical power and other twisted wire pairs carrying data with an Ethernet communication protocol. A UPS (uninterruptible power supply) system 20 is also connected to the electrical power carrying pair(s) of the Ethernet network.

A prioritized active splitter 22 pursuant to the teachings of the present invention connects the high priority devices 12, the mid priority level devices 14, and the low priority level devices 16 to the Ethernet network 18. The prioritized active splitter 22 connects the high priority devices 12 to the Ethernet network through one or more switches 24 connected to the twisted wire pair(s) carrying electrical power and the twisted wire pair(s) carrying data, connects the mid priority level devices 14 to the Ethernet through one or more switches 26 connected to the twisted wire pair(s) carrying electrical power and the twisted wire pair(s) carrying data, and connects the low priority level devices 16 to the Ethernet network through one or more switches 28 connected to the twisted wire pair(s) carrying electrical power and the twisted wire pair(s) carrying data.

In this exemplary embodiment, in the event of a power outage or disconnection of the Ethernet network, the switch (es) 28 disconnect the low priority devices 16 from the UPS system over the Ethernet and also from data communications over the Ethernet. In the event the power outage or disconnection lasts for some given duration of time (e.g. 2 hours), the switch(es) 26 disconnect the mid priority devices 14 from the UPS system over the Ethernet and also from data communications over the Ethernet. The critical high priority components remain connected to the Ethernet network through the switches 24 to be supplied with electrical power over the Ethernet network from the UPS system and also to communicate over the twisted wire pairs of the Ethernet network.

In some embodiments of the present invention, recognizing that some highest priority devices are never disconnected from the Ethernet network, the highest priority devices are connected directly to the Ethernet network, effectively eliminating a connection through the switches 24. Moreover, in some embodiments as illustrated by the left side of FIG. 1, one or more separate devices of the security system is preferably connected through a separate prioritized active splitter 22' to the Ethernet network. Also, the separate prioritized active splitter 22' might be a different priority splitter, e.g. a low priority active splitter for a low priority device 16', or a mid priority active splitter for a mid priority device 14'.

While several embodiments and variations of the present invention for a POE-prioritized active splitter are described in detail herein, it should be apparent that the disclosure and teachings of the present invention will suggest many alternative designs to those skilled in the art.

Having thus described our invention, what we claim as new and desire to secure by Letters Patent is:

1. A network for providing both data transmission and electrical power to hardware devices connected over the network, comprising:
    a plurality of network hardware devices connected over the network, wherein the network provides both data transmission and electrical power from a main electrical power supply to the plurality of network hardware devices, the network hardware devices comprising high priority network devices that are more critical devices of the network and low priority network devices that are less critical devices of the network;
    an uninterruptible power supply (UPS) coupled to the network to supply electrical power over the network to the network hardware devices in the event of a failure of the main electrical power supply;
    at least one prioritized active splitter coupled between the network and at least one low priority network device, the at least one prioritized active splitter providing electrical power from the UPS over the network to the at least one low priority network device with a low priority level and disconnecting the at least one low priority network device from receiving electrical power from the network in the event of a failure of the main electrical power supply, to reduce the power load on the UPS, with the high priority network devices remaining connected to receive electrical power from the network.

2. The network of claim 1, including at least one prioritized active splitter coupled between the network and a plurality of low priority network devices and providing electrical power from the UPS over the network to the plurality of low priority network devices with a low priority level and disconnecting the plurality of low priority network devices from receiving electrical power from the network in the event of a failure of the main electrical power supply, to reduce the power load on the UPS.

3. The network of claim 1, in a security system wherein the high priority network devices include a cable modem, a system router, fire alarm devices, local warning devices and an alarm communicator which are supplied with electrical power at the high priority level.

4. The network of claim 1, in a security system wherein the low priority network devices include HVAC (heating, ventilation, air conditioning) home comfort devices which are supplied with electrical power at the low priority level.

5. The network of claim 1, wherein the network comprises an Ethernet network including twisted wire pairs.

6. The network of claim 5, where in the event of a failure of the main electrical power supply, connected high priority devices communicate over the Ethernet network with a non-Ethernet reliant communication protocol.

7. The network of claim 1, wherein the network hardware devices also comprise mid priority network devices, and the at least one prioritized active splitter providing electrical power from the UPS over the network to the at least one mid priority network device with a mid priority level and disconnecting the at least one mid priority network device from receiving electrical power from the network, to reduce the power load on the UPS.

8. The network of claim 7, where in the event of a power outage or disconnection, the low priority devices are disconnected from the UPS system and from data communications over the network, and the high priority devices and mid priority devices remain connected to the network to be supplied with electrical power and data communications over the network, and in the event the power outage or disconnection lasts for a given duration of time, the mid priority devices are also disconnected from the UPS system and from data communications over the network.

9. The network of claim 7, in a security system wherein the high priority devices comprise components of a fire alarm system, and the mid priority devices comprise security components of the security system including intrusion detectors.

10. The network of claim 1, wherein the plurality of network hardware devices include a system router, and when the system router becomes disconnected from the network or inoperative, the network hardware devices still connected to the network communicate messages over the network with a fall-back, simple alternative communication protocol.

11. A method of supplying prioritized power over a network providing both data transmission and electrical power to hardware devices connected over the network, comprising:
    providing both data transmission and electrical power from a main electrical power supply to a plurality of network hardware devices connected over the network, wherein the network hardware devices comprising high priority network devices that are more critical devices of the network and low priority network devices that are less critical devices of the network;
    coupling an uninterruptible power supply (UPS) to the network to supply electrical power over the network to the network hardware devices in the event of a failure of the main electrical power supply;
    coupling at least one prioritized active splitter between the network and at least one low priority network device, the at least one prioritized active splitter providing electrical power from the UPS over the network to the at least one low priority network device with a low priority level and disconnecting the at least one low priority network device from receiving electrical power from the network in the event of a failure of the main electrical power supply, to reduce the power load on the UPS, with the high priority network devices remaining connected to receive electrical power from the network.

12. The method of claim 11, including coupling at least one prioritized active splitter between the network and a plurality of low priority network devices and providing electrical power from the UPS over the network to the plurality of low priority network devices with a low priority level and disconnecting the plurality of low priority network devices from receiving electrical power from the network in the event of a failure of the main electrical power supply, to reduce the power load on the UPS.

13. The method of claim 11, including coupling high priority network devices to the network in a security system that includes a cable modem, a system router, fire alarm devices, local warning devices and an alarm communicator, which are supplied with electrical power at the high priority level.

14. The method of claim 11, including coupling low priority network devices to the network in a security system that includes HVAC (heating, ventilation, air conditioning) home comfort devices, which are supplied with electrical power at the low priority level.

15. The method of claim 11, including coupling the network as an Ethernet network including twisted wire pairs.

16. The method of claim 15, where in the event of a failure of the main electrical power supply, connected high priority devices communicating over the Ethernet network with a non-Ethernet reliant communication protocol.

17. The method of claim 11, including coupling mid priority network devices to the network, and the at least one prioritized active splitter providing electrical power from the UPS over the network to the at least one mid priority network device with a mid priority level and disconnecting the at least one mid priority network device from receiving electrical power from the network, to reduce the power load on the UPS.

18. The method of claim 17, where in the event of a power outage or disconnection, disconnecting the low priority devices from the UPS system and from data communications over the network, while leaving the high priority devices and mid priority devices connected to the network to be supplied with electrical power and data communications over the network, and in the event the power outage or disconnection lasts for a given duration of time, also disconnecting the mid priority devices from the UPS system and from data communications over the network.

19. The method of claim 17, including connecting to the network high priority devices in a security system comprising components of a fire alarm system and mid priority devices comprising security components of the security system including intrusion detectors.

20. The method of claim 11, including connecting to the network a system router, and when the system router becomes disconnected from the network or inoperative, the network hardware devices still connected to the network communicating messages over the network with a fall-back, simple alternative communication protocol.

* * * * *